United States Patent
Li et al.

(10) Patent No.: US 12,352,708 B2
(45) Date of Patent: Jul. 8, 2025

(54) DETECTION METHOD FOR THE RADIATION-INDUCED DEFECTS OF OXIDE LAYER IN ELECTRONIC DEVICES

(71) Applicant: Harbin Institute of Technology, Harbin (CN)

(72) Inventors: Xingji Li, Harbin (CN); Jianqun Yang, Harbin (CN); Xiaodong Xu, Harbin (CN); Gang Lv, Harbin (CN); Xiuhai Cui, Harbin (CN); Tao Ying, Harbin (CN); Yadong Wei, Harbin (CN)

(73) Assignee: Harbin Institute of Technology, Harbin (CN)

( * ) Notice: Subject to any disclaimer, the term of this patent is extended or adjusted under 35 U.S.C. 154(b) by 849 days.

(21) Appl. No.: 17/626,819

(22) PCT Filed: Jul. 27, 2021

(86) PCT No.: PCT/CN2021/108674
§ 371 (c)(1),
(2) Date: Jan. 13, 2022

(87) PCT Pub. No.: WO2022/022509
PCT Pub. Date: Feb. 3, 2022

(65) Prior Publication Data
US 2022/0349843 A1 Nov. 3, 2022

(30) Foreign Application Priority Data
Jul. 28, 2020 (CN) .......................... 202010735200.7

(51) Int. Cl.
*G01N 23/18* (2018.01)

(52) U.S. Cl.
CPC .................................. *G01N 23/18* (2013.01)

(58) Field of Classification Search
CPC ......... G01N 23/18; G01N 23/02; H01L 22/14
See application file for complete search history.

(56) References Cited

U.S. PATENT DOCUMENTS

2020/0150060 A1* 5/2020 Lee .................... G01N 21/9501

FOREIGN PATENT DOCUMENTS

| CN | 103868973 A | * | 6/2014 | |
|---|---|---|---|---|
| CN | 103926519 A | * | 7/2014 | |
| CN | 111855704 A | * | 10/2020 | ............. G01N 23/02 |

* cited by examiner

*Primary Examiner* — Christopher E Mahoney
(74) *Attorney, Agent, or Firm* — Chun-Ming Shih; LANWAY IPR SERVICES (57) ABSTRACT

The present invention provides a detection method for radiation-induced defects of an oxide layer in electronic devices. The detection method includes the following steps: selecting a semiconductor material to be prepared into a substrate; preparing a back electrode on an upper surface of the substrate; growing an oxide layer on the back electrode; etching one side of the oxide layer, and exposing an etched part out of the back electrode; preparing a front electrode on an upper surface of the oxide layer; forming a plurality of grooves in the front electrode, and distributing the plurality of grooves in a grid shape to prepare a test sample; and performing a radiation test on the test sample, and detecting radiation-induced defects. By using the detection method provided by the present invention, rapid identification and detection of electrons and holes are achieved.

10 Claims, 4 Drawing Sheets

DETECTION METHOD FOR THE RADIATION-INDUCED DEFECTS OF OXIDE LAYER IN ELECTRONIC DEVICES

TECHNICAL FIELD

The present invention relates to the technical field of electronic devices, in particular to, a detection method for radiation-induced defects of an oxide layer in electronic devices.

BACKGROUND ART

When an electronic device is radiated, electron-hole pairs may be generated in a semiconductor material and an oxide layer in the electronic devices, most of these electron-hole pairs may be initially combined, and the remaining electron-hole pairs will be diffused or drifted away under the action of a concentration gradient or electric field. In the semiconductor material, the migration rate of electrons does not differ from that of holes a lot, and therefore, great influences may not be caused when the radiation dosage is accumulated; however, in the oxide layer, the migration rate of electrons differs from that of holes a lot, the electrons formed by radiation will be migrated out of oxides, the remaining holes may be trapped by defects in the oxides in a transportation process, and thus, radiation-induced defects of the oxide layer are formed.

Most of the radiation-induced defects of the oxides are oxygen vacancy defects, and these defects are relevant to an oxidation technology. The oxygen vacancy defects may trap holes and may also trap electrons. When there is a lack of oxygen atoms between two adjacent silicon atoms, a bonding force between the two silicon atoms is relatively weak, and surrounding holes or electrons may be relatively easily trapped, so that a bond between the two silicon atoms is ruptured to form a positively charged oxygen vacancy or a negatively charged oxygen vacancy, that is, an oxide trapped charge. The oxide trapped charge in the electronic devices directly affects the quality and reliability of the electronic device.

Radiation-induced defects of the oxide layer are distributed in different states and may be positively charged or negatively charged, and these features may affect property evolution of the electronic device. An existing micro-analysis means for detecting the states of the defects in the semiconductor material is relatively low in sensitivity and incapable of checking and analyzing radiation-induced defects of the oxide layer, and therefore, how to rapidly, efficiently and accurately detect the states of radiation-induced defects of the oxide layer in the electronic devices becomes a problem to be solved urgently at present.

SUMMARY OF THE INVENTION

The problem to be solved by the present invention is how to rapidly, efficiently and accurately detect states of radiation-induced defects of an oxide layer in electronic devices.

For solving the above-mentioned problem, the present invention provides a detection method for radiation-induced defects of an oxide layer in electronic devices. The detection method includes the following steps:

step S100: selecting a semiconductor material to be prepared into a substrate, wherein the resistivity of the substrate is 0.00001 to 10 Ω·cm, or the doping concentration of the substrate is greater than 1e18 $cm^{-3}$;

step S200: preparing a back electrode on an upper surface of the substrate;

step S300: growing an oxide layer on the back electrode;

step S400: etching one side of the oxide layer, and exposing an etched part out of the back electrode;

step S500: preparing a front electrode on an upper surface of the oxide layer;

step S600: forming a plurality of grooves in the front electrode, and distributing the plurality of grooves in a grid shape to prepare a test sample; and step S700: performing a radiation test on the test sample, applying an electric field to the back electrode and the front electrode, detecting a leakage current of the test sample before and after radiation, determining whether electron/hole traps exist in the oxide layer, and extracting a trapped electron/hole concentration in the oxide layer.

Optionally, the step S700 specifically includes:

step S710: grounding the back electrode and the front electrode of the test sample, performing photon radiation, applying an electric field to the back electrode and the front electrode of the test sample before and after radiation, detecting the first change degree of the leakage current, determining whether the electron traps exist in the oxide layer, and extracting the trapped electron concentration in the oxide layer according to the first change degree of the leakage current; and step S720: applying an electric field to the back electrode and the front electrode of the test sample, performing photon radiation, applying an electric field to the back electrode and the front electrode of the test sample before and after radiation, detecting the second change degree of the leakage current, determining whether the hole traps exist in the oxide layer, and extracting the trapped hole concentration in the oxide layer according to the second change degree of the leakage current.

Optionally, the step S710 specifically includes:

step S711: grounding the back electrode and the front electrode of the test sample, and performing photon radiation with the energy being lower than 9 eV;

step S712: applying an electric field having the intensity of 10 V/cm to $10^5$ V/cm to the back electrode and the front electrode of the test sample before and after radiation, and detecting the first change degree of the leakage current;

step S713: if the leakage current does not change before and after radiation, determining that the electron traps do not exist in the oxide layer; and if the leakage current changes before and after radiation, determining that the electron traps exist in the oxide layer; and step S714: extracting the trapped electron concentration in the oxide layer according to the first change degree of the leakage current.

Optionally, in the step S711, a radiation source for photon radiation is selected from one of ultraviolet lights, infrared lights and microwaves.

Optionally, the step S720 specifically includes:

step S721: applying an electric field having the intensity of 1 V/cm to $10^3$ V/cm to the back electrode and the front electrode of the test sample, and performing electron radiation with the energy being lower than 200 keV;

step S722: applying an electric field having the intensity of 10 V/cm to $10^5$ V/cm to the back electrode and the front electrode of the test sample before and after radiation, and detecting the second change degree of the leakage current;

step S723: if the leakage current does not change before and after radiation, determining that the hole traps do not exist in the oxide layer; and if the leakage current changes before and after radiation, determining that the hole traps exist in the oxide layer; and step S724: extracting the trapped hole concentration in the oxide layer according to the second change degree of the leakage current.

Optionally, in the step S721, a radiation source for photon radiation is selected from one of electrons, protons, heavy ions, neutrons, X rays and γ rays.

Optionally, in the step S100, the thickness $t_1$ of the substrate is 1 mm to 100 mm.

Optionally, in the step S400, the area of the etched part is not smaller than 100 μm×100 μm.

Optionally, in the step S600, the sum of areas of the plurality of grooves is 1 μm² to 100 mm², and the width $W_1$ of each of the plurality of grooves is 1 μm to 1 mm.

Optionally, in the step S600, the number of the plurality of grooves is not smaller than 50.

Compared with the prior art, the detection method provided by the present invention lies in that the growth manner and process of the oxide layer growing on the sample can be controlled, the state of the oxide layer in the electronic devices can be simulated, and a specific defect detecting structure may be prepared in the oxide layer, so that rapid identification and detection of electrons and holes are achieved, and the purposes of efficiently detecting and determining radiation-induced defects of the oxide layer at high sensitivity are achieved.

The present invention provides a new detecting technology for radiation-induced defects of an oxide layer in electronic devices. The method is simple in steps, easy to operate and capable of greatly reducing the test expense. By using the method provided by the present invention, states of radiation-induced defects of oxide layers of different types of electronic devices can be efficiently and rapidly identified and determined, which is significant to the promotion of research on an anti-radiation hardening technology for the electronic devices.

DETAILED DESCRIPTION OF THE INVENTION

To make the above-mentioned objectives, features and advantages of the present invention more obvious and comprehensible, specific embodiments of the present invention will be described in detail below with reference to the accompanying drawings. It should be noted that all the following embodiments are merely intended to describe an implementation method and typical parameters of the present invention, rather than to limit the range of the parameters in the present invention, and reasonable changes derived therefrom still fall within the protection scope of the claims of the present invention.

An embodiment of the present invention discloses a detection method for radiation-induced defects of an oxide layer in electronic devices. The application objects of the detection method include an oxide layer and a passivation layer in a silicon device, a wide-bandgap semiconductor device, a narrow-bandgap semiconductor device, a compound semiconductor device and the like. Protons, electrons, heavy ions, neutrons and photons with different energy in a radiation environment may induce a great number of radiation-induced defects inside the electronic device, and these defects are easier to generate in the passivation layer and the oxide layer inside the electronic device. Moreover, these defects have different trapping features and states for electrons and holes, some defects may only trap holes, some defects may only trap electrons, some defects may trap both holes and electrons. By using the method disclosed by the embodiment of the present invention, the states of radiation-induced defects of the oxide layers in different types of electronic devices may be efficiently and rapidly identified and determined.

Figure 1:
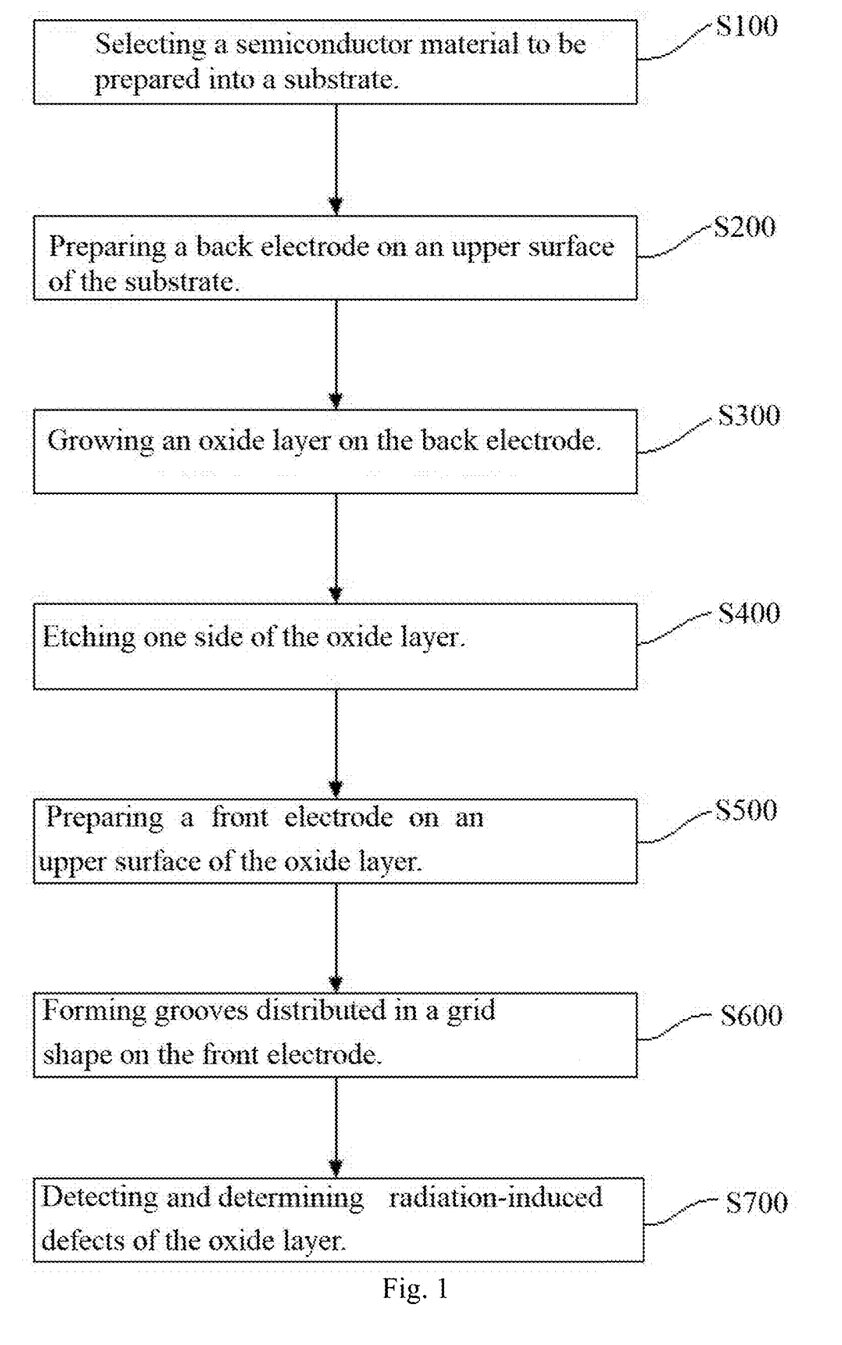
FIG. 1 is a flow chart showing a detection method for radiation-induced defects of an oxide layer in electronic devices according to an embodiment of the present invention.

As shown in FIG. 1, the detection method for radiation-induced defects of an oxide layer in electronic devices includes the following steps.

Step S100: an N-type or P-type semiconductor material is selected to be prepared into a substrate, wherein the resistivity of the substrate is 0.00001 to 10 Ω·cm, or the doping concentration of the substrate is greater than 1e18 cm⁻³, and the resistivity or the doping concentration is limited, which is beneficial to the preparation of electrodes on the substrate. The thickness $t_1$ of the substrate is controlled at 1 mm to 100 mm, by which it is convenient to subsequently select a radiation source for performing a radiation test.

Step S200: a back electrode is prepared on an upper surface of the substrate. The preparation manner of the electrode may be selected from physical vapor deposition, chemical vapor deposition, gold metallization, aluminum metallization, copper metallization and the like.

Step S300: an oxide layer is grown on the back electrode. The state of an oxide layer on a sample has to be consistent with the state of the oxide layer in the electronic devices. In this way, it may be ensured that radiation-induced defects of the oxide layer on the sample are the same as the state of the oxide layer in the electronic devices. The state of the oxide layer includes thickness, growth manner, growth atmosphere and growth environment of the oxide layer and the like, and the growth manner includes a dry oxygen manner, a wet oxygen manner, a dry and wet oxygen mixed manner and the like.

Step S400: one side of the oxide layer is etched, and an etched part is exposed out of the back electrode. An etching manner may be selected from dry etching, plasma etching or wet etching. The area of the etched part is not smaller than 100 μm×100 μm, which facilitates subsequent application of an electric field and detection of a leakage current. Etching may be performed at the narrowest side of the oxide layer, so that the etching operation is convenient, and the process is easier to control.

Step S500: a front electrode is prepared on an upper surface of the oxide layer. The preparation manner of the electrode is the same as that in the step S200 and may be selected from physical vapor deposition, chemical vapor deposition, gold metallization, aluminum metallization, copper metallization and the like.

Step S600: a plurality of grooves are formed in the front electrode, and the plurality of grooves are distributed in a grid shape to prepare a test sample. The sum of areas of the plurality of grooves is 1 $\mu m^2$ to 100 $mm^2$, the widths $W_1$ of the grooves are 1 $\mu m$ to 1 mm, and the number of the plurality of grooves is not smaller than 50. The grid grooving may guarantee the distribution uniformity of the electric field and ensure that the test sample is not damaged under the action of the electric field.

Step S700: a radiation test is performed on the test sample, an electric field is applied to the back electrode and the front electrode, a leakage current of the test sample before and after radiation is detected, it is determined whether electron/hole traps exist in the oxide layer, and a trapped electron/hole concentration in the oxide layer is extracted.

The step S700 includes an electron trap and hole trap detection step which specifically includes:

step S710: the back electrode and the front electrode of the test sample are grounded, photon radiation is performed, an electric field is applied to the back electrode and the front electrode of the test sample before and after radiation, the first change degree of the leakage current is detected, it is determined whether the electron traps exist in the oxide layer, and the trapped electron concentration in the oxide layer is extracted according to the first change degree of the leakage current; and step S720: an electric field is applied to the back electrode and the front electrode of the test sample, photon radiation is performed, an electric field is applied to the back electrode and the front electrode of the test sample before and after radiation, the second change degree of the leakage current is detected, it is determined whether the hole traps exist in the oxide layer, and the trapped hole concentration in the oxide layer is extracted according to the second change degree of the leakage current.

Protons, electrons, heavy ions, neutrons and photons with different energy in a radiation environment may induce a great number of radiation-induced defects of the oxide layer in the electronic devices, and these defects have different trapping features and states for electrons and holes, some defects may only trap the holes, some defects may only trap the electrons, some defects may trap both the holes and the electrons. In the step S700, electron and hole trapping states are respectively detected, so that the states of radiation-induced defects of the oxide layer are identified and determined.

Figure 2:
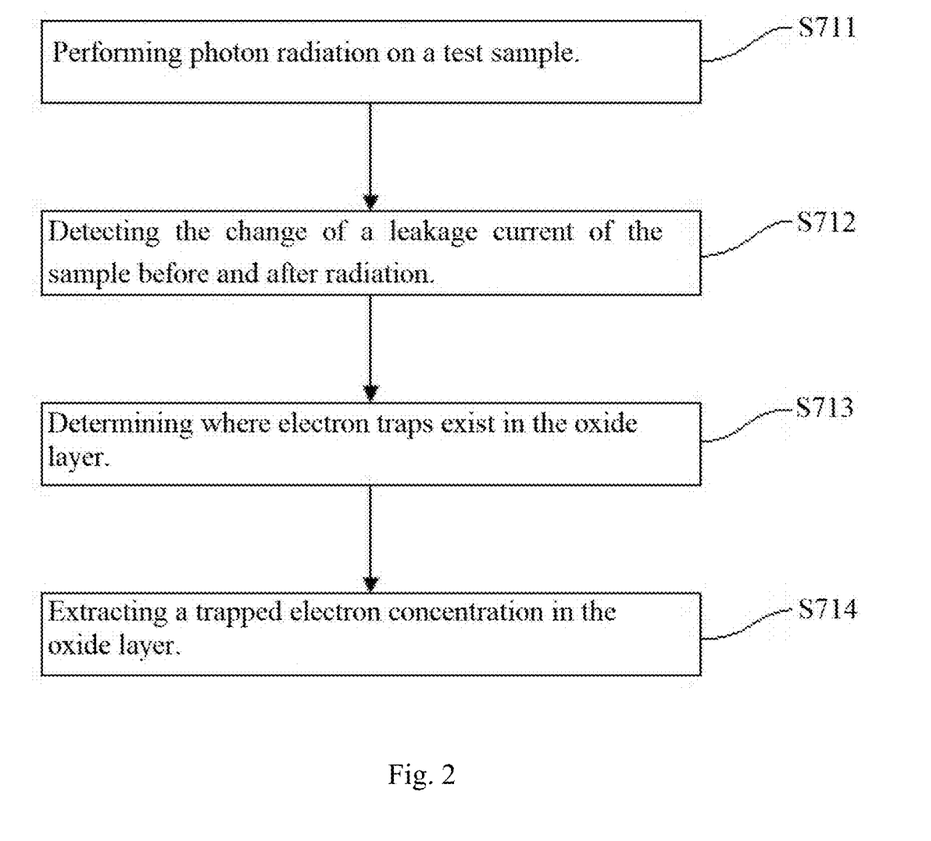
FIG. 2 is a flow chart showing a step S710 according to an embodiment of the present invention.

As shown in FIG. 2, the step S710 is used for inducing electrons and specifically includes the steps.

Step S711: the back electrode and the front electrode of the test sample are grounded, and photon radiation with the energy being lower than 9 is performed. A radiation source for photon radiation is ultraviolet lights, infrared lights or microwaves.

Step S712: an electric field having the intensity of 10 V/cm to $10^5$ V/cm is applied to the back electrode and the front electrode of the test sample before and after radiation, and the first change degree of the leakage current is detected.

step S713: the electron traps are capable of resulting in the increment of the leakage current; if the leakage current does not change before and after radiation, it is determined that the electron traps do not exist in the oxide layer; and if the leakage current changes before and after radiation, it is determined that the electron traps exist in the oxide layer.

step S714: the trapped electron concentration in the oxide layer is extracted according to the first change degree of the leakage current. The first change degree of the leakage current is relevant to the trapped electron concentration in the oxide layer, a specific relationship is expressed as I1=n1qAv, wherein I1 represents the first change degree of the leakage current, n1 represents the trapped electron concentration, q represents the quantity of electron charges, A represents the cross sectional area of a conductor, and v represents the directional migration rate of free electrons.

Figure 3:
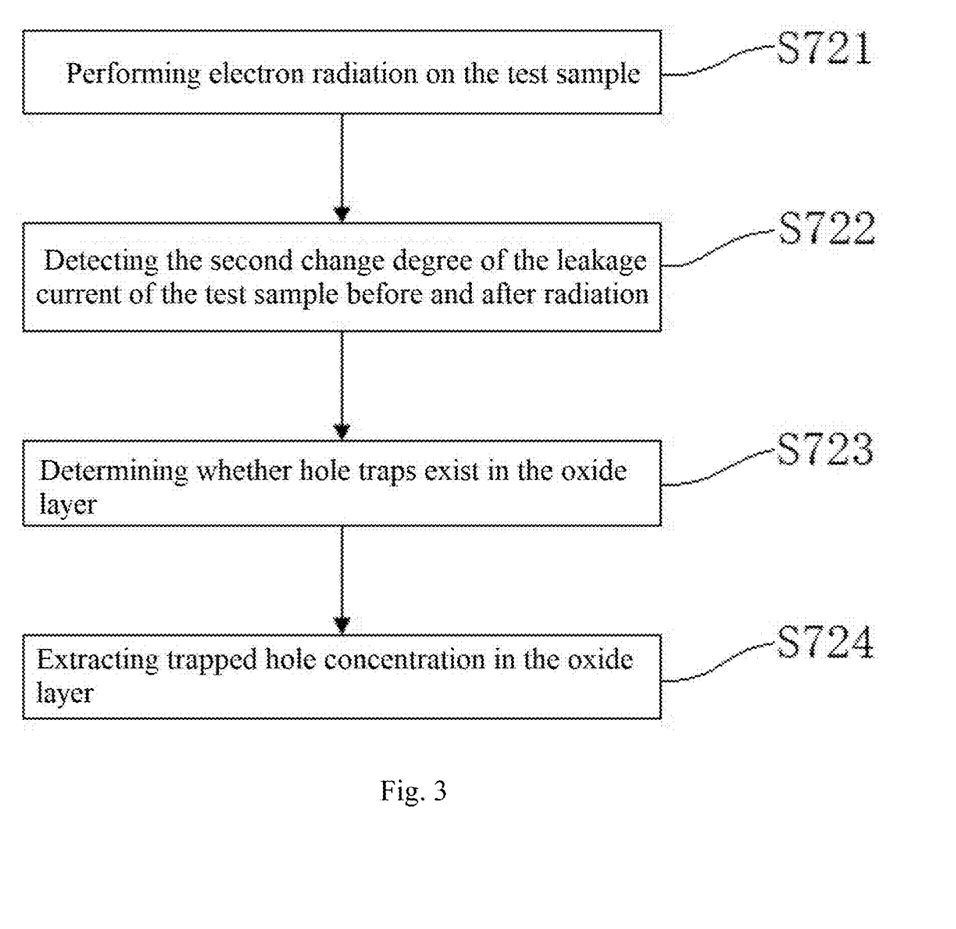
FIG. 3 is a flow chart showing a step S720 according to an embodiment of the present invention.

As shown in FIG. 3, the step S710 is used for inducing holes and specifically includes the steps.

Step S721: an electric field having the intensity of 1 V/cm to $10^3$ V/cm is applied to the back electrode and the front electrode of the test sample, and electron radiation with the energy being lower than 200 keV is performed. A radiation source for photon radiation is electrons, protons, heavy ions, neutrons, X rays or γ rays.

Step S722: an electric field having the intensity of 10 V/cm to $10^5$ V/cm is applied to the back electrode and the front electrode of the test sample before and after radiation, and the second change degree of the leakage current is detected.

Step S723: the hole traps are capable of resulting in the increment of the leakage current; if the leakage current does not change before and after radiation, it is determined that the hole traps do not exist in the oxide layer; and if the leakage current changes before and after radiation, it is determined that the hole traps exist in the oxide layer.

Step S724: the trapped hole concentration in the oxide layer is extracted according to the second change degree of the leakage current. The second change degree of the leakage current is relevant to the trapped hole concentration in the oxide layer, a specific relationship is expressed as I2=n2qAv, wherein I2 represents the second change degree of the leakage current, n2 represents the trapped hole concentration, q represents the quantity of electron charges, A represents the cross sectional area of a conductor, and v represents the directional migration rate of free electrons.

According to the embodiment of the present invention, a specific detecting structure for defects in the oxide layer is prepared based on the consistent growth manner and process of the oxide layers in the test sample and the electronic device, so that the rapid identification and detection of electrons and holes are achieved, and the purpose of rapidly, efficiently and accurately detecting radiation-induced defects of the oxide layer in the electronic devices is achieved.

First Embodiment

Figure 4:
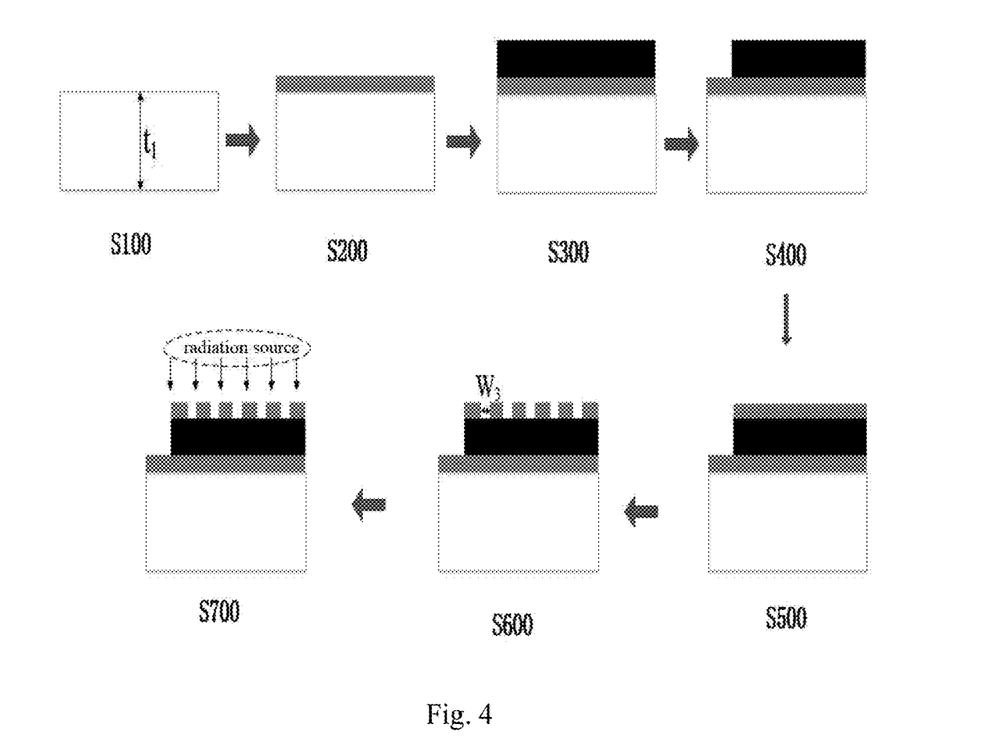
FIG. 4 is a schematic diagram showing a principle of a detection method for radiation-induced defects of an oxide layer in electronic devices according to a first embodiment of the present invention.
Figure 5:
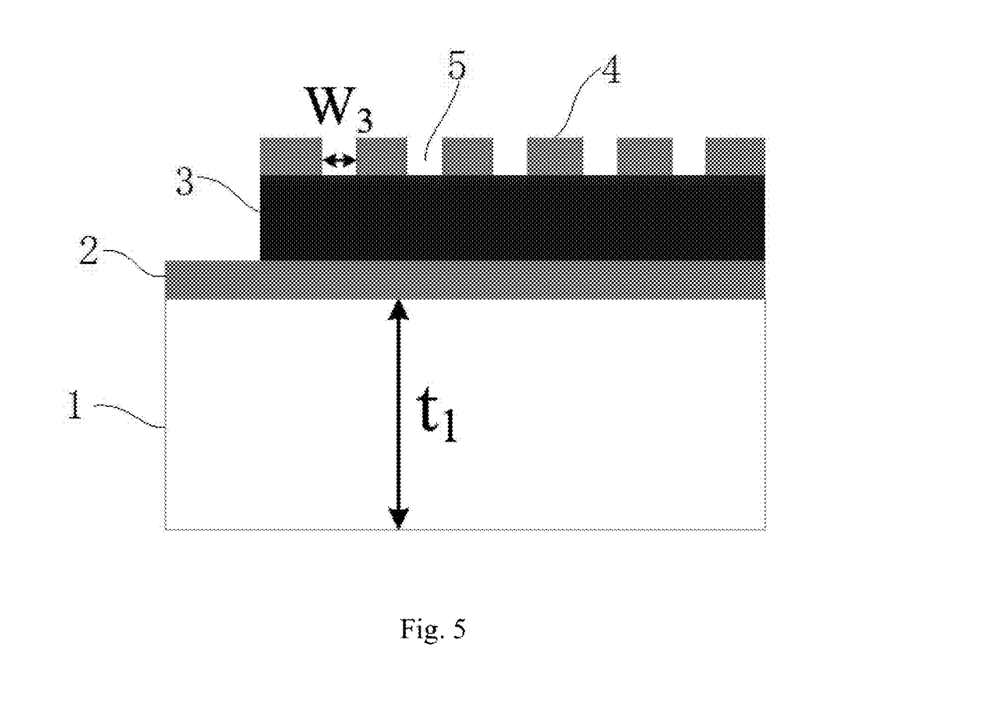
FIG. 5 is a schematic diagram showing a structure of a test sample according to the first embodiment of the present invention.

The present embodiment provides a detection method for radiation-induced defects of an oxide layer in electronic devices. As shown in FIG. 4 and FIG. 5, the detection method includes the following steps.

Step S100: an N-type semiconductor material is selected to be prepared into a substrate 1, wherein the doping concentration of the substrate 1 is 1e19 $cm^{-3}$, the thickness $t_1$ of the substrate 1 is 50 mm, and the substrate is square and has the area of 10 mm×10 mm.

Step S200: a back electrode 2 is prepared on an upper surface of the substrate 1 by physical vapor deposition.

Step S300: an oxide layer is prepared on the back electrode 2 in a dry/wet oxygen mixed manner. Specifically, firstly, dry oxygen oxidation is performed for 30 min, then, wet oxygen oxidation is performed for 60 min, and finally, dry oxygen oxidation is performed for 50 min. The manner is the same as an oxidation manner of a to-be-tested electronic device.

Step S400: one side of the oxide layer 3 is etched, wherein the etching area is 1 mm×10 mm, and wet etching is adopted as an etching manner; and an etched part is exposed out of the back electrode 2.

Step S500: a front electrode 4 is prepared on an upper surface of the oxide layer 3 by physical vapor deposition.

Step S600: a plurality of grooves 5 are formed in the front electrode 4, and the plurality of grooves are distributed in a grid shape. The sum of areas of the plurality of grooves 5 is 1 mm$^2$, the widths of the grooves 5 are 0.2 mm, and thus, a test sample is prepared.

Step S700: a radiation test is performed on the test sample, an electric field is applied to the back electrode and the front electrode, a leakage current of the test sample before and after radiation is detected, it is determined whether electron traps/hole traps exist in the oxide layer 3, and a trapped electron concentration/trapped hole concentration in the oxide layer is extracted.

The step S700 includes an electron trap and hole trap detection step which specifically includes the steps.

Step S711: the back electrode and the front electrode of the test sample are grounded, and photon radiation is performed by taking ultraviolet light of which the energy is 4 eV as a radiation source.

Step S712: an electric field having the intensity of 10$^5$ V/cm is applied to the back electrode and the front electrode of the test sample before and after radiation, and the first change degree of the leakage current is detected.

Step S713: if the leakage current does not change before and after radiation, it is determined that the electron traps do not exist in the oxide layer 3; and if the leakage current changes before and after radiation, it is determined that the electron traps exist in the oxide layer 3.

Step S714: the trapped electron concentration in the oxide layer 3 is extracted according to the first change degree of the leakage current.

Step S721: an electric field having the intensity of 10$^3$ V/cm is applied to the back electrode and the front electrode of the test sample, and electron radiation is performed by taking electrons of which the energy is 190 keV as a radiation source.

Step S722: an electric field having the intensity of 10$^5$ V/cm is applied to the back electrode and the front electrode of the test sample before and after radiation, and the second change degree of the leakage current is detected.

Step S723: if the leakage current does not change before and after radiation, it is determined that the hole traps do not exist in the oxide layer 3; and if the leakage current changes before and after radiation, it is determined that the hole traps exist in the oxide layer 3.

Step S724: the trapped hole concentration in the oxide layer 3 is extracted according to the second change degree of the leakage current.

Second Embodiment

The present embodiment provides a detection method for radiation-induced defects of an oxide layer in electronic devices. The detection method includes the following steps.

Step S100: a P-type semiconductor material is selected to be prepared into a substrate, wherein the doping concentration of the substrate is 1e20 cm$^{-3}$, the thickness of the substrate is 1 mm, and the substrate is square and has the area of 1 mm×1 mm.

Step S200: a back electrode is prepared on an upper surface of the substrate by chemical vapor deposition.

Step S300: an oxide layer is prepared on the back electrode in a dry oxygen manner. Specifically, dry oxygen oxidation is performed for 80 min. The manner is the same as an oxidation manner of a to-be-tested electronic device.

Step S400: one side of the oxide layer is etched, wherein the etching area is 100 μm×100 μm and wet etching is adopted as an etching manner; and an etched part is exposed out of the back electrode.

Step S500: a front electrode is prepared on an upper surface of the oxide layer by chemical vapor deposition.

Step S600: a plurality of grooves are formed in the front electrode, and the plurality of grooves are distributed in a grid shape. The sum of areas of the plurality of grooves is 1 μm$^2$, the width of each of the plurality of grooves are 1 μm, and thus, a test sample is prepared.

Step S700: a radiation test is performed on the test sample, an electric field is applied to the back electrode and the front electrode, a leakage current of the test sample before and after radiation is detected, it is determined whether electron/hole traps exist in the oxide layer, and a trapped electron/hole concentration in the oxide layer is extracted.

The step S700 includes an electron trap and hole trap detection step which specifically includes the steps.

Step S711: the back electrode and the front electrode of the test sample are grounded, and photon radiation is performed by taking ultraviolet light of which the energy is 5 eV as a radiation source.

Step S712: an electric field having the intensity of 10$^4$ V/cm is applied to the back electrode and the front electrode of the test sample before and after radiation, and the change of the leakage current is detected.

Step S713: if the leakage current does not change before and after radiation, it is determined that the electron traps do not exist in the oxide layer; and if the leakage current changes before and after radiation, it is determined that the electron traps exist in the oxide layer.

Step S714: the trapped electron concentration in the oxide layer is extracted according to the change degree of the leakage current.

Step S721: an electric field having the intensity of 10$^2$ V/cm is applied to the back electrode and the front electrode of the test sample, and electron radiation is performed by taking protons of which the energy is 150 keV as a radiation source.

Step S722: an electric field having the intensity of 10$^4$ V/cm is applied to the back electrode and the front electrode of the test sample before and after radiation, and the second change degree of the leakage current is detected.

Step S723: if the leakage current does not change before and after radiation, it is determined that the hole traps do not exist in the oxide layer; and if the leakage current changes before and after radiation, it is determined that the hole traps exist in the oxide layer.

Step S724: the trapped hole concentration in the oxide layer is extracted according to the second change degree of the leakage current.

Third Embodiment

The present embodiment provides a detection method for radiation-induced defects of an oxide layer in electronic devices. The detection method includes the following steps.

Step S100: an N-type semiconductor material is selected to be prepared into a substrate, wherein the doping concentration of the substrate is 1e21 cm$^{-3}$, the thickness of the substrate is 100 mm, and the substrate is rectangular and has the area of 1 mm×2 mm.

Step S200: a back electrode is prepared on an upper surface of the substrate by gold metallization.

Step S300: an oxide layer is prepared on the back electrode in a wet oxygen manner. Specifically, wet oxygen oxidation is performed for 90 min. The manner is the same as an oxidation manner of a to-be-tested electronic device.

Step S400: one side of the oxide layer is etched, wherein the etching area is 0.5 mm×1 mm, and plasma etching is adopted as an etching manner; and an etched part is exposed out of the back electrode.

Step S500: a front electrode is prepared on an upper surface of the oxide layer by gold metallization.

Step S600: a plurality of grooves are formed in the front electrode, and the plurality of grooves are distributed in a grid shape. The sum of areas of the plurality of grooves is 1000 μm$^2$, the width of each of the plurality of grooves is 0.1 mm, and thus, a test sample is prepared.

Step S700: a radiation test is performed on the test sample, an electric field is applied to the back electrode and the front electrode, a leakage current of the test sample before and after radiation is detected, it is determined whether electron traps/hole traps exist in the oxide layer, and a trapped electron concentration/trapped hole concentration in the oxide layer is extracted.

The step S700 includes an electron trap and hole trap detection step which specifically includes the steps.

Step S711: the back electrode and the front electrode of the test sample are grounded, and photon radiation is performed by taking ultraviolet light of which the energy is 6 eV as a radiation source.

Step S712: an electric field having the intensity of 10$^3$ V/cm is applied to the back electrode and the front electrode of the test sample before and after radiation, and the change of the leakage current is detected.

Step S713: if the leakage current does not change before and after radiation, it is determined that the electron traps do not exist in the oxide layer; and if the leakage current changes before and after radiation, it is determined that the electron traps exist in the oxide layer.

Step S714: the trapped electron concentration in the oxide layer is extracted according to the change degree of the leakage current.

Step S721: an electric field having the intensity of 10 V/cm is applied to the back electrode and the front electrode of the test sample, and electron radiation is performed by taking heavy ions of which the energy is 110 keV as a radiation source.

Step S722: an electric field having the intensity of 10$^3$ V/cm is applied to the back electrode and the front electrode of the test sample before and after radiation, and the change of the leakage current is detected.

Step S723: if the leakage current does not change before and after radiation, it is determined that the hole traps do not exist in the oxide layer; and if the leakage current changes before and after radiation, it is determined that the hole traps exist in the oxide layer.

Step S724: the trapped hole concentration in the oxide layer is extracted according to the change degree of the leakage current.

Fourth Embodiment

The present embodiment provides a detection method for radiation-induced defects of an oxide layer in electronic devices. The detection method includes the following steps.

Step S100: an N-type semiconductor material is selected to be prepared into a substrate, wherein the substrate has the resistivity of 5 Ω·cm and the thickness of 80 mm, and the substrate is rectangular and has the area of 50 mm×70 mm.

Step S200: a back electrode is prepared on an upper surface of the substrate by aluminum metallization.

Step S300: an oxide layer is prepared on the back electrode in a dry/wet oxygen mixed manner. Specifically, dry oxygen oxidation is performed for 40 min, and then, wet oxygen oxidation is performed for 80 min. The manner is the same as an oxidation manner of a to-be-tested electronic device.

Step S400: one side of the oxide layer is etched, wherein the etching area is 10 mm×1 mm, and plasma etching is adopted as an etching manner; and an etched part is exposed out of the back electrode.

Step S500: a front electrode is prepared on an upper surface of the oxide layer by aluminum metallization.

Step S600: a plurality of grooves are formed in the front electrode, and the plurality of grooves are distributed in a grid shape. The sum of areas of the plurality of grooves is 100 mm$^2$, the width of each of the plurality of grooves is 1 mm, and thus, a test sample is prepared.

Step S700: a radiation test is performed on the test sample, an electric field is applied to the back electrode and the front electrode, a leakage current of the test sample before and after radiation is detected, it is determined whether electron/hole traps exist in the oxide layer, and a trapped electron/hole concentration in the oxide layer is extracted.

The step S700 includes an electron trap and hole trap detection step which specifically includes the steps.

Step S711: the back electrode and the front electrode of the test sample are grounded, and photon radiation is performed by taking infrared light of which the energy is 7 eV as a radiation source.

Step S712: an electric field having the intensity of 10$^2$ V/cm is applied to the back electrode and the front electrode of the test sample before and after radiation, and the change of the leakage current is detected.

Step S713: if the leakage current does not change before and after radiation, it is determined that the electron traps do not exist in the oxide layer; and if the leakage current changes before and after radiation, it is determined that the electron traps exist in the oxide layer.

Step S714: the trapped electron concentration in the oxide layer is extracted according to the change degree of the leakage current.

Step S721: an electric field having the intensity of 1 V/cm is applied to the back electrode and the front electrode of the test sample, and electron radiation is performed by taking protons of which the energy is 80 keV as a radiation source.

Step S722: an electric field having the intensity of 10$^2$ V/cm is applied to the back electrode and the front electrode of the test sample before and after radiation, and the second change degree of the leakage current is detected.

Step S723: if the leakage current does not change before and after radiation, it is determined that the hole traps do not exist in the oxide layer; and if the leakage current changes before and after radiation, it is determined that the hole traps exist in the oxide layer.

Step S724: the trapped hole concentration in the oxide layer is extracted according to the second change degree of the leakage current.

Fifth Embodiment

The present embodiment provides a detection method for radiation-induced defects of an oxide layer in electronic devices. The detection method includes the following steps.

Step S100: a P-type semiconductor material is selected to be prepared into a substrate, wherein the substrate has the resistivity of 0.01 Ω·cm and the thickness of 30 mm, and the substrate is square and has the area of 20 mm×20 mm.

Step S200: a back electrode is prepared on an upper surface of the substrate by copper metallization.

Step S300: an oxide layer is prepared on the back electrode in a dry/wet oxygen mixed manner. Specifically, wet oxygen oxidation is performed for 45 min, then, dry oxygen oxidation is performed for 20 min, and finally, wet oxygen oxidation is performed for 60 min. The manner is the same as an oxidation manner of a to-be-tested electronic device.

Step S400: one side of the oxide layer is etched, wherein the etching area is 5 mm×2 mm, and dry etching is adopted as an etching manner; and an etched part is exposed out of the back electrode.

Step S500: a front electrode is prepared on an upper surface of the oxide layer by copper metallization.

Step S600: a plurality of grooves are formed in the front electrode, and the plurality of grooves are distributed in a grid shape. The sum of areas of the plurality of grooves is 10 mm$^2$, the widths of the grooves are 200 μm, and thus, a test sample is prepared.

Step S700: a radiation test is performed on the test sample, an electric field is applied to the back electrode and the front electrode, a leakage current of the test sample before and after radiation is detected, it is determined whether electron/hole traps exist in the oxide layer, and a trapped electron/hole concentration in the oxide layer is extracted.

The step S700 includes an electron trap and hole trap detection step which specifically includes the steps.

Step S711: the back electrode and the front electrode of the test sample are grounded, and photon radiation is performed by taking microwaves of which the energy is 8 eV as a radiation source.

Step S712: an electric field having the intensity of 10 V/cm is applied to the back electrode and the front electrode of the test sample before and after radiation, and the change of the leakage current is detected.

Step S713: if the leakage current does not change before and after radiation, it is determined that the electron traps do not exist in the oxide layer; and if the leakage current changes before and after radiation, it is determined that the electron traps exist in the oxide layer.

Step S714: the trapped electron concentration in the oxide layer is extracted according to the change degree of the leakage current.

Step S721: an electric field having the intensity of $10^3$ V/cm is applied to the back electrode and the front electrode of the test sample, and electron radiation is performed by taking X rays of which the energy is 180 keV as a radiation source.

Step S722: an electric field having the intensity of 10 V/cm is applied to the back electrode and the front electrode of the test sample before and after radiation, and the change of the leakage current is detected.

Step S723: if the leakage current does not change before and after radiation, it is determined that the hole traps do not exist in the oxide layer; and if the leakage current changes before and after radiation, it is determined that the hole traps exist in the oxide layer.

Step S724: the trapped hole concentration in the oxide layer is extracted according to the second change degree of the leakage current.

Sixth Embodiment

The present embodiment provides a detection method for radiation-induced defects of an oxide layer in electronic devices. The detection method includes the following steps.

Step S100: a P-type semiconductor material is selected to be prepared into a substrate, wherein the substrate has the resistivity of 1 Ω·cm and the thickness of 10 mm, and the substrate is square and has the area of 10 mm×10 mm.

Step S200: a back electrode is prepared on an upper surface of the substrate by physical vapor deposition.

Step S300: an oxide layer is prepared on the back electrode in a dry/wet oxygen mixed manner. Specifically, wet oxygen oxidation is performed for 30 min, and then, dry oxygen oxidation is performed for 90 min. The manner is the same as an oxidation manner of a to-be-tested electronic device.

Step S400: one side of the oxide layer is etched, wherein the etching area is 10.1 mm×3 mm, and dry etching is adopted as an etching manner; and an etched part is exposed out of the back electrode.

Step S500: a front electrode is prepared on an upper surface of the oxide layer by physical vapor deposition.

Step S600: a plurality of grooves are formed in the front electrode, and the plurality of grooves are distributed in a grid shape. The sum of areas of the plurality of grooves is 5 mm$^2$, the widths of the grooves are 50 μm, and thus, a test sample is prepared.

Step S700: a radiation test is performed on the test sample, an electric field is applied to the back electrode and the front electrode, a leakage current of the test sample before and after radiation is detected, it is determined whether electron traps/hole traps exist in the oxide layer, and a trapped electron concentration/trapped hole concentration in the oxide layer is extracted.

The step S700 includes an electron trap and hole trap detection step which specifically includes the steps.

Step S711: the back electrode and the front electrode of the test sample are grounded, and photon radiation is performed by taking microwaves of which the energy is 3 eV as a radiation source.

Step S712: an electric field having the intensity of $10^4$ V/cm is applied to the back electrode and the front electrode of the test sample before and after radiation, and the change of the leakage current is detected.

Step S713: if the leakage current does not change before and after radiation, it is determined that the electron traps do not exist in the oxide layer; and if the leakage current changes before and after radiation, it is determined that the electron traps exist in the oxide layer.

Step S714: the trapped electron concentration in the oxide layer is extracted according to the change degree of the leakage current.

Step S721: an electric field having the intensity of $10^2$ V/cm is applied to the back electrode and the front electrode of the test sample, and electron radiation is performed by taking γ rays of which the energy is 50 keV as a radiation source.

Step S722: an electric field having the intensity of $10^4$ V/cm is applied to the back electrode and the front electrode of the test sample before and after radiation, and the change of the leakage current is detected.

Step S723: if the leakage current does not change before and after radiation, it is determined that the hole traps do not exist in the oxide layer; and if the leakage current changes before and after radiation, it is determined that the hole traps exist in the oxide layer.

Step S724: the trapped hole concentration in the oxide layer is extracted according to the second change degree of the leakage current.

The embodiment of the present invention discloses a brand new detecting technology for radiation-induced defects of an oxide layer in electronic devices. The method is simple in step, easy to operate and capable of greatly reducing the test expense. By using the method provided by the present invention, states of radiation-induced defects of oxide layers of different types of electronic devices can be efficiently and rapidly identified and determined, which is significant to the promotion of research on an anti-radiation hardening technology for the electronic devices.

Although the present invention is disclosed as above, the protection scope of the present invention is not limited to this. The skilled in the art may make various changes and modifications without departing from the spirit and scope of the present invention, and these changes and modifications will all fall within the protection scope of the present invention.

The invention claimed is:

1. A detection method for radiation-induced defects of an oxide layer in electronic devices, comprising the following steps:
    step S100: selecting a semiconductor material to be prepared into a substrate, wherein a resistivity of the substrate is 0.00001 to 10 Ω·cm, or a doping concentration of the substrate is greater than 1e18 cm$^{-3}$;
    step S200: preparing a back electrode on an upper surface of the substrate;
    step S300: growing an oxide layer on the back electrode;
    step S400: etching one side of the oxide layer, and exposing an etched part out of the back electrode;
    step S500: preparing a front electrode on an upper surface of the oxide layer;
    step S600: forming a plurality of grooves in the front electrode, and distributing the plurality of grooves in a grid shape to prepare a test sample; and
    step S700: performing a radiation test on the test sample, applying an electric field to the back electrode and the front electrode, detecting a leakage current of the test sample before and after radiation, determining whether electron traps/hole traps exist in the oxide layer, and extracting a trapped electron concentration/trapped hole concentration in the oxide layer.

2. The detection method for radiation-induced defects of an oxide layer in electronic devices of claim 1, wherein the step S700 comprises:
    step S710: grounding the back electrode and the front electrode of the test sample, performing photon radiation, applying an electric field to the back electrode and the front electrode of the test sample before and after radiation for detecting a first change degree of a leakage current, determining whether electron traps exist in the oxide layer, and extracting a trapped electron concentration in the oxide layer according to the first change degree of the leakage current; and
    step S720: applying an electric field to the back electrode and front electrode of the test sample, performing photon radiation, applying an electric field to the back electrode and the front electrode of the test sample before and after radiation for detecting a second change degree of the leakage current, determining whether hole traps exist in the oxide layer, and extracting a trapped hole concentration in the oxide layer according to the second change degree of the leakage current.

3. The detection method for radiation-induced defects of an oxide layer in electronic devices of claim 2, wherein the step S710 comprises:
    step S711: grounding the back electrode and the front electrode of the test sample, and performing photon radiation with an energy being lower than 9 eV;
    step S712: applying an electric field having an intensity of 10 V/cm to $10^5$ V/cm to the back electrode and the front electrode of the test sample before and after radiation, and detecting the first change degree of the leakage current;
    step S713: if the leakage current does not change before and after radiation, determining that the electron traps do not exist in the oxide layer; and if the leakage current changes before and after radiation, determining that the electron traps exist in the oxide layer; and
    step S714: extracting the trapped electron concentration in the oxide layer according to the first change degree of the leakage current.

4. The detection method for radiation-induced defects of an oxide layer in electronic devices of claim 3, wherein in the step S711, a radiation source for photon radiation is selected from one of ultraviolet lights, infrared lights and microwaves.

5. The detection method for radiation-induced defects of an oxide layer in electronic devices of claim 2, wherein the step S720 comprises:
    step S721: applying an electric field having an intensity of 1 V/cm to $10^3$ V/cm to the back electrode and the front electrode of the test sample, and performing electron radiation with an energy being lower than 200 keV;
    step S722: applying an electric field having an intensity of 10 V/cm to $10^5$ V/cm to the back electrode and the front electrode of the test sample before and after radiation, and detecting the second change degree of the leakage current;
    step S723: if the leakage current does not change before and after radiation, determining that the hole traps do not exist in the oxide layer; and if the leakage current changes before and after radiation, determining that the hole traps exist in the oxide layer; and
    step S724: extracting the trapped hole concentration in the oxide layer according to the second change degree of the leakage current.

6. The detection method for radiation-induced defects of an oxide layer in electronic devices of claim 5, wherein in the step S721, a radiation source for photon radiation is selected from one of electrons, protons, heavy ions, neutrons, X rays and γ rays.

7. The detection method for radiation-induced defects of an oxide layer in electronic devices of claim 1, wherein in the step S100, a thickness $t_1$ of the substrate is 1 mm to 100 mm.

8. The detection method for radiation-induced defects of an oxide layer in electronic devices of claim 1, wherein in the step S400, an area of the etched part is not smaller than 100 μm×100 μm.

9. The detection method for radiation-induced defects of an oxide layer in electronic devices of claim 1, wherein in the step S600, a sum of areas of the plurality of grooves is 1 μm$^2$ to 100 mm$^2$, and a width $W_1$ of each of the plurality of grooves is 1 μm to 1 mm.

10. The detection method for radiation-induced defects of an oxide layer in electronic devices of claim 9, wherein in the step S600, a number of the plurality of grooves is not smaller than 50.

* * * * *